United States Patent [19]

Joyes

[11] 4,260,938

[45] Apr. 7, 1981

[54] CONTROL CIRCUITS FOR ELECTRICALLY DRIVEN VEHICLES

[75] Inventor: John F. Joyes, Solihull, England

[73] Assignee: Lucas Industries Limited, Birmingham, England

[21] Appl. No.: 880,344

[22] Filed: Feb. 23, 1978

Related U.S. Application Data

[63] Continuation of Ser. No. 661,502, Feb. 26, 1976, abandoned.

[30] Foreign Application Priority Data

Feb. 28, 1975 [GB] United Kingdom ............... 8364/75

[51] Int. Cl.² .............................................. H02P 7/28
[52] U.S. Cl. ..................................... 318/434; 318/139
[58] Field of Search ............... 318/367, 375, 376, 373, 318/139, 341, 434, 432

[56] References Cited

U.S. PATENT DOCUMENTS

| | | | |
|---|---|---|---|
| 3,456,177 | 7/1969 | Wilkerson | 318/338 |
| 3,484,676 | 12/1969 | Wilkerson | 318/376 |
| 3,841,238 | 10/1974 | Thompson et al. | 318/341 |
| 3,914,671 | 10/1975 | Morton | 318/139 |

Primary Examiner—David Smith, Jr.

[57] ABSTRACT

A control circuit for a d.c. motor for an electric vehicle operates by controlling motor current in accordance with the error between a current demand signal and a signal derived from a current transducer. The current demand signal is generated by a potentiometer array, with the potentiometer slider connected to an input terminal of an operation amplifier. This amplifier has its output terminal connected by a resistor to a capacitor connected by another resistor to the base of an emitter follower transistor. The emitter of this transistor is coupled by a feedback resistor to the inverting input terminal of the operational amplifier.

5 Claims, 4 Drawing Figures

CONTROL CIRCUITS FOR ELECTRICALLY DRIVEN VEHICLES

This is a continuation of application Ser. No. 661,502, filed Feb. 26, 1976 abandoned.

This invention relates to control circuits for electrically driven vehicles and has as an object to provide such a control circuit in a convenient form.

A control circuit in accordance with the invention comprises a motor current demand signal generator, a motor current transducer and a motor control circuit controlling the motor current in accordance with the error between the current demand signal and a signal corresponding to the output of said transducer, said demand signal generator including a potentiometer having its slider connected to an input terminal of an operational amplifier, a capacitor having one terminal connected by a first resistor to the output terminal of the operational amplifier, and by a second resistor to the base of a transistor connected as an emitter follower, the emitter of said transistor providing the current demand signal and being connected via a feedback resistor to the inverting input terminal of the operational amplifier.

Figure 1:
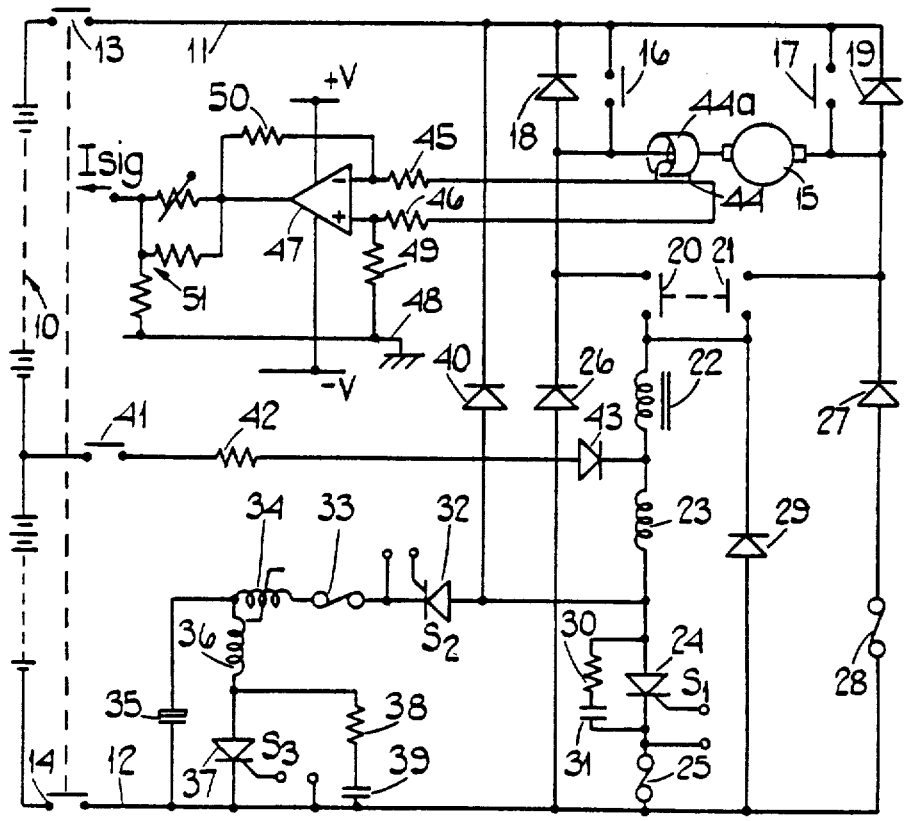
Figure 2:
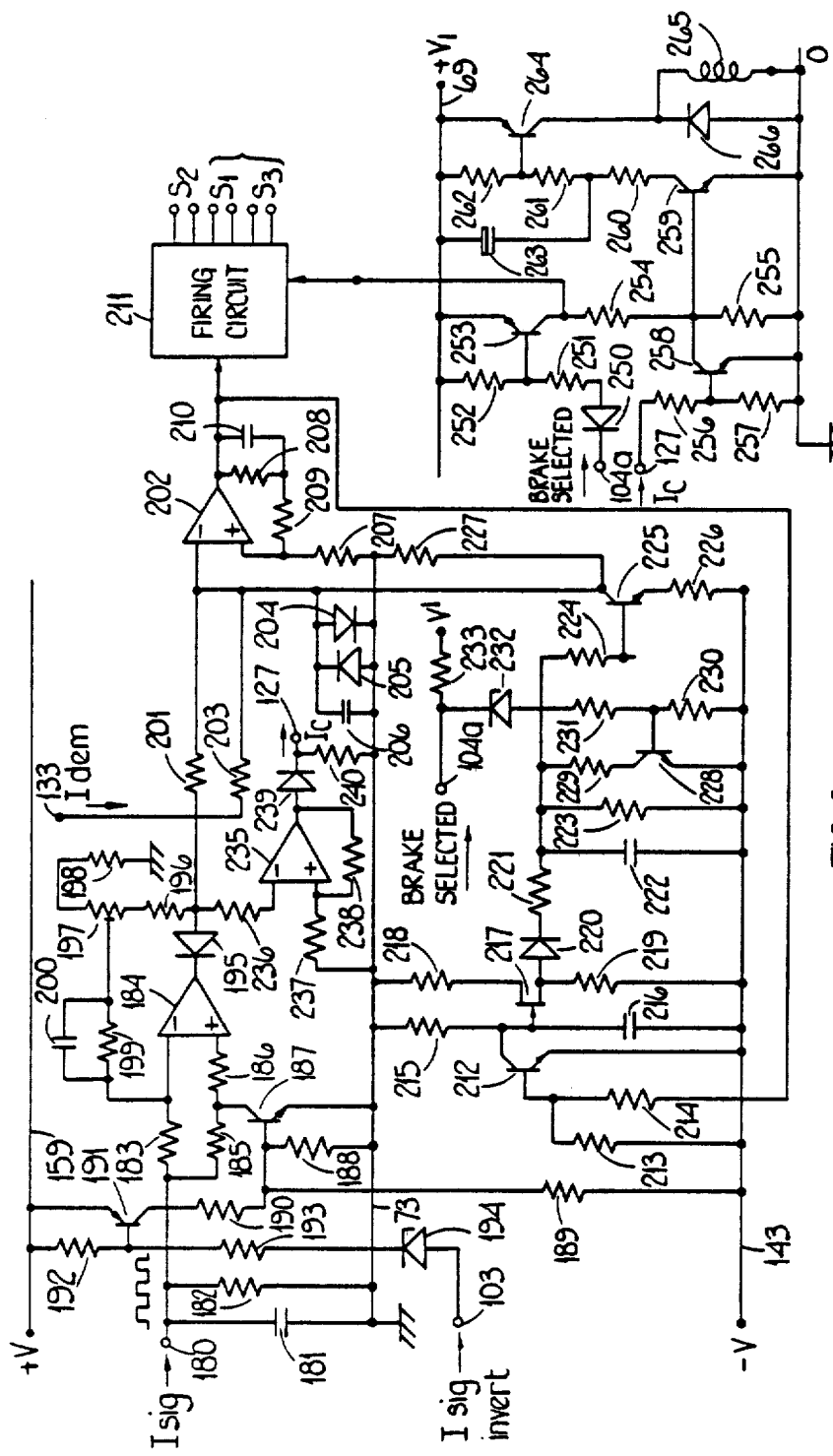
Figure 3:
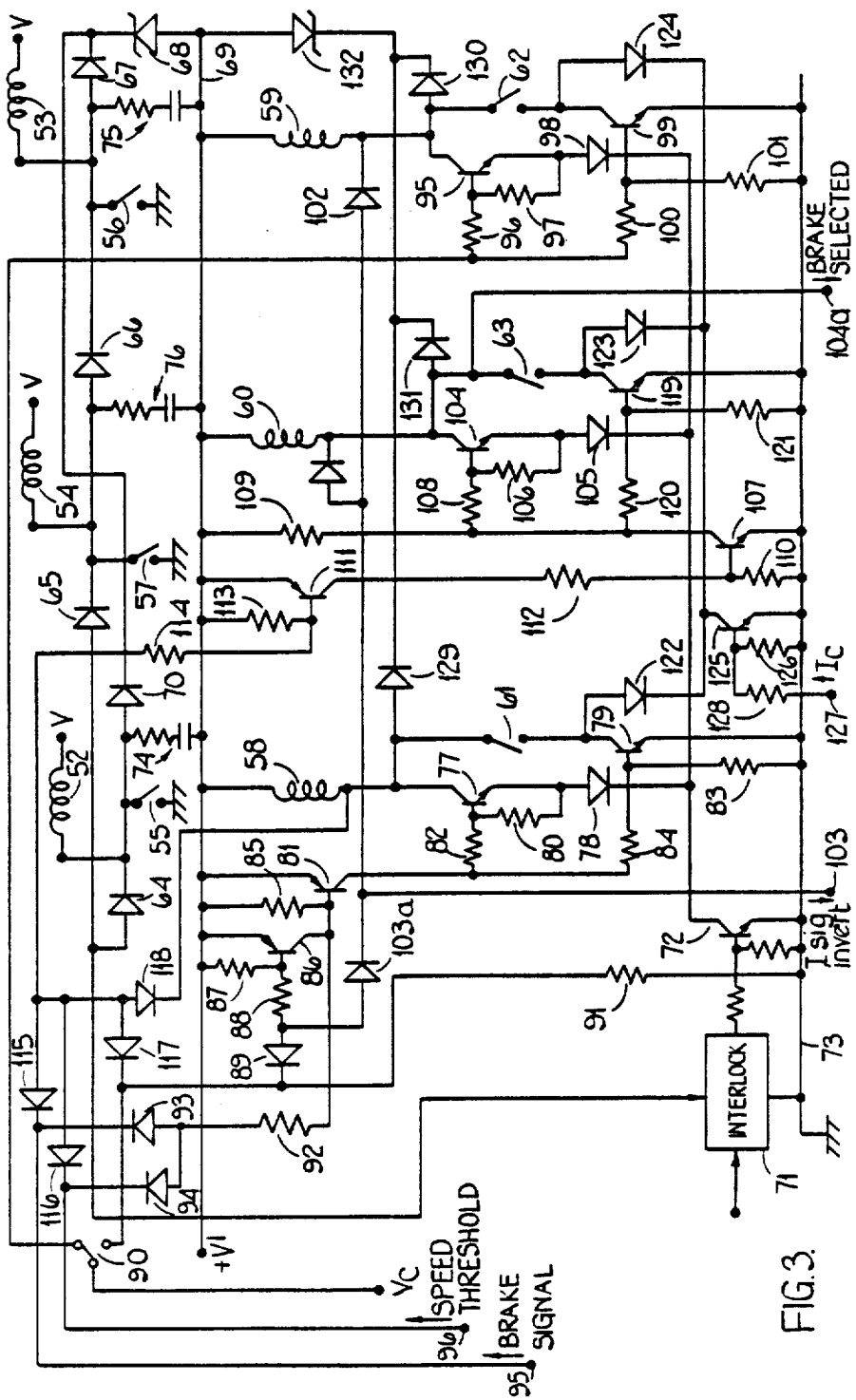
Figure 4:
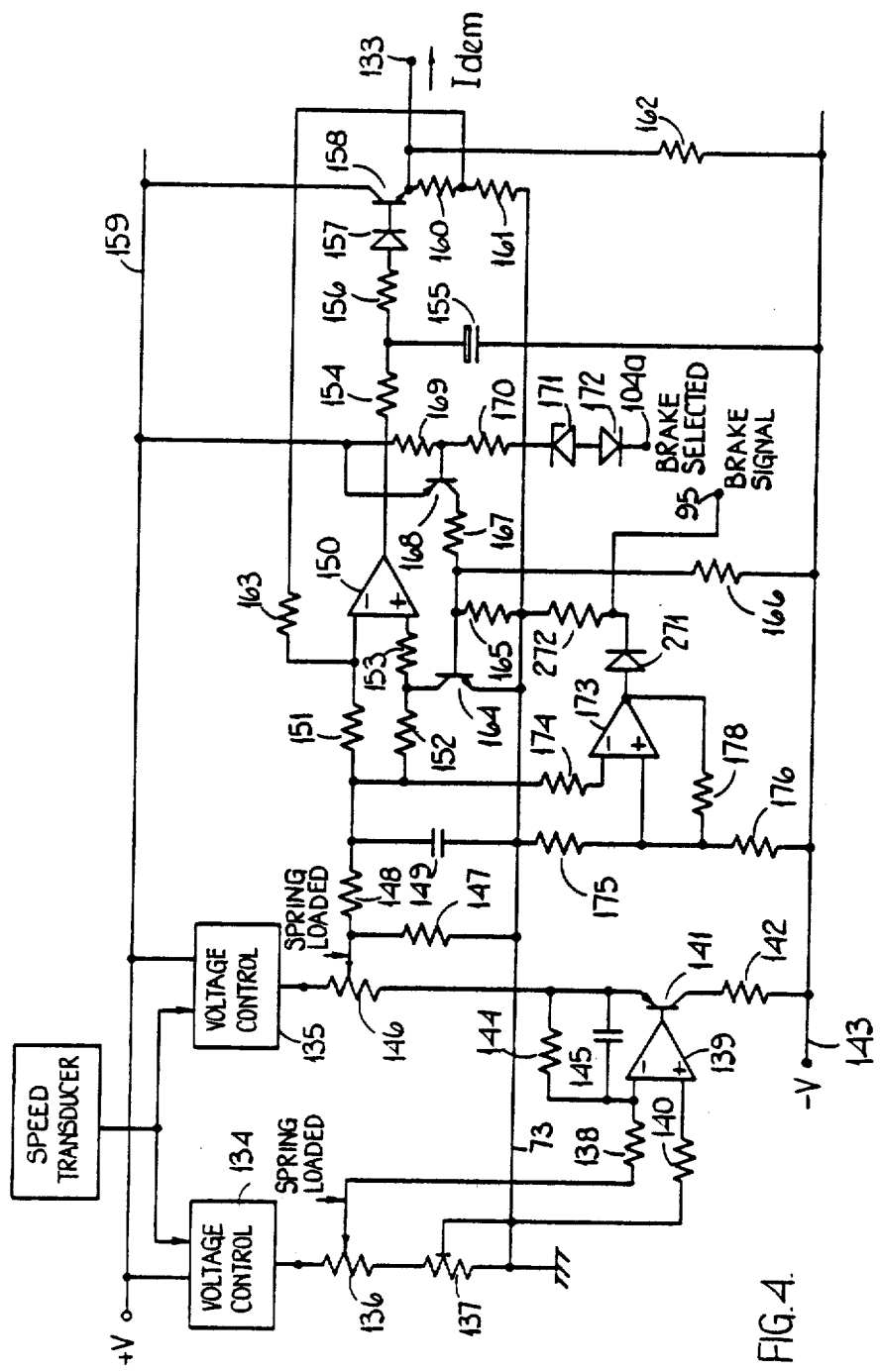

In the accompanying drawings:

FIG. 1 is a circuit diagram of a motor control circuit forming part of a control circuit in accordance with the invention, and FIGS. 2, 3 and 4 are circuit diagrams for other parts of the control circuit.

Referring firstly to FIG. 1, the motor control uses a high voltage battery 10 opposite poles of which are connected to positive and negative supply lines 11, 12 via main power contacts 13, 14 which are ganged together.

A motor has one side of its armature 15 connected via a forward running contact 16 to the rail 11 and the other side of its armature connected by a reverse running contact 17 to the rail 11. The contact 16 is bridged by a diode 18 with its cathode connected to the rail 11 and the contact 17 is bridged by a diode 19 having its cathode connected to the rail 11. A pair of ganged contacts 20, 21 which are operable independently of the contacts 16, 17 are provided for controlling the connection of the armature 15 in series with an inductor 22, the field winding 23 of the motor, a thyristor 24 and a fuse 25 to the rail 12. The contact 20 connects said one side of the armature to the inductor 22 and the contact 21 connects the other side of the armature to the inductor 22, the contact 20 being open when the contact 21 is closed and vice versa. A diode 26 connects the anode of the diode 18 to the rail 12 and a diode 27 connects the anode of the diode 19 via a fuse 28 to the rail 12. Each diode 26, 27 has its cathode connected to the anode of the corresponding diode 18, 19. A further diode 29 connects the contacts 20, 21 to the rail 12, the diode 29 having its anode connected to the rail 12.

The thyristor 24 has its anode connected to the field winding 23 and its cathode connected to the fuse 25. The thyristor 24 is bridged by a series circuit consisting of a resistor 30 and a capacitor 31. A second thyristor 32 has its anode connected to the anode of the thyristor 24 and its cathode connected via a fuse 33, a saturable core inductor 34 and a capacitor 35 in series to the rail 12. Connected across the capacitor 35 is a series circuit consisting of an air cored inductor 36 and a third thyristor 37 having its anode connected to the inductor 36 and its cathode connected to the rail 12. The thyristor 37 is bridged by a series circuit consisting of a resistor 38 and a capacitor 39. A diode 40 connects the anode of the thyristor 32 to the rail 11, the cathode of the diode 40 being connected to the rail 11.

For forward running of the motor the contacts 16 and 21 are both closed so that current can flow from the rail 11 via the contact 16, the armature 15, the contact 21, the inductor 22, the field winding 23, the thyristor 24 and fuse 25, to the rail 12. For reverse running the contacts 17 and 20 are closed and current then flows from the rail 11 through the contact 17, through the armature 15 in the opposite direction, through the contact 20 and then through the inductor 22, the field winding 23, the thyristor 24 and the fuse 25, to the rail 12. For regenerative braking when the motor is running forwardly the contacts 16 and 17 are both opened but the contact 20 is closed. Current induced in the armature 15 can then flow through the contact 20, the inductor 22, the field winding 23, the thyristor 24, the fuse 25, the fuse 28 and the diode 27.

The current through the armature field winding is controlled by the three thyristors 24, 32 and 37. The thyristor 32 is fired periodically to charge the capacitor 35. The thyristors 24 and 37 are fired subsequently, the thyristor 37 effecting reversal of the charge on the capacitor 35. The thyristor 32, when fired, turns off the thyristor 24.

FIG. 1 also shows a connection from a low voltage point on the battery 10 via a contact 41, a resistor 42 and a diode 43 to the interconnection of the inductor 22 and the field winding 23 the contact 41 is operated as will be explained hereinafter when regenerative braking is required but when the current passing through the armature 15 is below a predetermined level.

FIG. 1 also shows the circuit diagram of a motor current transducer which includes a Hall plate current detector 44 in an iron loop 45 surrounding one of the armature conductors. The Hall plate 44 is connected via two resistors 45, 46 to the invert and non-invert input terminals of an operational amplifier 47. The non-invert input terminal is connected to an earth rail 48 via a resistor 49 and a feedback resistor 50 connects the output terminal of the operational amplifier 47 to the invert input terminal thereof. A resistance network 51 is provided at the output of the operational amplifier 47 to provide temperature compensation. The output from the operational amplifier 47 is in the form of an analog signal of frequency dependent on the frequency of which the thyristors 24, 32 are switched, of magnitude corresponding to the magnitude of the current flowing through the motor and of polarity dependent on the direction of current flow through the motor.

The contacts 16 and 17 are operated by two coils 52 and 53 (see FIG. 3) and the contacts 20, 21 are operated by a coil 54. Coil 52 is connected between a positive supply terminal and a normally-open relay contact 55 which, when closed completes a circuit through the coil 52 to earth. The coils 53 and 54 are similarly controlled by normally-open relay contacts 56 and 57 and the windings for the three relays are indicated by reference numerals 58, 59, 50 respectively. Each relay has a latching contact 61, 62, 63. A diode 64 has its cathode connected to the interconnection of the coil 52 and the contact 55 and a diode has its cathode connected to the interconnection of the coil 54 and the contact 57. The anodes of the two diodes 64, 65 are connected together and a further diode 66 has its anode connected to the cathode of the diode 65 and its cathode connected to the interconnection of the coil 53 and the contact 56. Yet another diode 67 has its anode connected to the cathode of the diode 66 and its cathode connected to the cathode of a Zener diode 68 which has its anode connected to a twelve volt supply line 69. A diode 70 has its cathode connected to the cathode of the Zener diode 68 and its anode connected to the interconnection of the coil 52 and the contact 55.

The anode of the diodes 64, 65 are connected to an interlock circuit 71 which controls an n-p-n transistor 72 which has its emitter connected to a ground rail 73. The interlock circuit 71 switches off the transistor 72 whenever any one of the contacts 55, 56 and 57 is closed. Furthermore each contact 55, 56, 57 has associated with it an R-C delay circuit 74, 75, 76 connected to the rail 69 so as to delay the rise in voltage at the appropriate coil/contact interconnection for a predetermined time after the contact is opened. In this way, the interlock circuit keeps the transistor 72 switched off for this predetermined time after opening of all three contacts 55, 56 and 57.

The relay winding 58 is connected between the rail 69 and the collector of a n-p-n transistor 77 which has its emitter connected via a diode 78 to the collector of the transistor 72, the cathode of the diode 78 being connected to the collector of the transistor 72. The latching contact 61 of this relay is connected between the collector of the transistor 77 and the collector of a transistor 79 which has its emitter connected to the ground rail 73. The base of the transistor 77 is connected to its emitter via a resistor 80 and to the collector of a p-n-p transistor 81 by a resistor 82. The base of the transistor 79 is connected to the ground rail by a resistor 83 and to the collector of the transistor 81 by a resistor 84. The emitter of the transistor 81 is connected to the rail 69 and its base is also connected to this rail via a resistor 85. A further p-n-p transistor 86 has its emitter connected to the rail 69 and its collector connected to the base of the transistor 81. The base of the transistor 86 is connected via the resistor 87 to the rail 69 and by a resistor 88 to the anode of a diode 89. The cathode of the diode 89 is connected to one output terminal of a two-way switch 90 which, in fact, is a relay operable by direction selector switches to the suitable interlock circuit (not shown). The common pole of the switch 90 is connected to a terminal which, in use, is at a voltage close to but lower than the voltage on the rail 69. The cathode of the diode 89 is also connected to the ground rail 73 via a resistor 91. The base of the transistor 81 is also connected via a resistor 92 to the anodes of two diodes 93, 94, with their cathodes respectively connected to two terminals 95 and 96, the signal at terminal 95 is generated by part of the circuit shown in FIG. 4 and will be described later but for the present it may be said that the signal at terminal 95 is at a high voltage when regenerative braking is required and at a low voltage otherwise. The signal at terminal 96 is at a high voltage whenever the vehicle wheel speed is in excess of a predetermined minimum (say 6 miles per hour). Thus, provided the signal at terminal 95 is low and the contact 90 is arranged to connect the common terminal to the cathode of the diode 89, the transistor 81 will conduct and transistor 77 will also be turned on provided transistor 72 is conductive. This will energise the relay 58 closing the contact 55 and also closing the latching contact 61.

The reverse relay winding 59 is connected between the rail 69 and the collector of a transistor 95 which has its base connected via a resistor to the other terminal of the changeover switch 90. The base of the transistor 95 is also connected via a resistor 97 to its emitter which is connected to the anode of a diode 98 having its cathode connected to the collector of the transistor 72. The latching contact 62 is connected between the collector of the transistor 95 and the collector of a transistor 99 which has its emitter grounded to the rail 73. The base of the transistor 99 is connected via a resistor 100 to said other pole of the switch 90 and is also connected to the ground rail 73 by a resistor 101. A diode 102 has its cathode connected to the collector of the transistor 95 and its anode connected to an output terminal 103 the purpose of which will be described hereinafter and also to the cathode of a diode 103 the anode of which is connected to the anode of the diode 89.

The relay winding 60 is connected between the rail 69 and the collector of a transistor 104. The emitter of the transistor 104 is connected to the anode of a diode 105 the cathode of which is connected to the collector of the transistor 72. The base of the transistor 104 is connected to its emitter via a resistor 106 and to the collector of a transistor 107 via a resistor 108. The emitter of the transistor 107 is connected to the ground rail 73 and its collector is connected to the rail 69 via a resistor 109. The base of the transistor 107 is connected to the earth rail 73 by a resistor 110 and to the collector of a p-n-p transistor 111 by a resistor 112. The emitter of the transistor 111 is connected to the rail 69 and the base of the transistor 111 is connected to the rail 69 by a resistor 113. A resistor 114 connects the base of the transistor 111 to the anodes of four diodes 115, 116, 117 and 118. The cathode of the diodes 115 and 116 are connected to the terminals 95 and 96 and the cathodes of the diode 117 is connected to the first-mentioned output terminal of the switch 90. The cathode of the diode 118 is connected to the collector of the transistor 77. The latching contact 63 of the relay winding 60 is connected between the collector of the transistor 104 and the collector of a transistor 119 which has its emitter grounded. The base of the transistor 119 is connected to the collector of the transistor 107 by a resistor 120 and to the ground rail 73 by a resistor 121.

The collectors of the transistors 79, 99 and 119 are connected to the anodes of three diodes 122, 123 and 124 respectively, and the cathodes of these three diodes are connected to the collector of an n-p-n transistor 125. The base of the transistor 125 is connected to the ground rail 73 by a resistor 126 and its emitter is directly grounded to this rail. An input terminal 127 which forms part of the circuit shown in FIG. 2 is connected via a resistor 128 to the base of the transistor 125. Three diodes 129, 130 and 131 have their anodes connected to the collectors of the transistors 77, 95 and 104 and their cathodes connected to the cathode of a Zener diode 132 which has its anode connected to the rail 69.

As well as providing proper control of the coils 52, 53 and 54 in response to instructions from other parts of the circuit, the circuit described above also ensures that improper use of the switch 90 does not result in dangerous short circuit conditions in the power control circuitry. Whenever any of the relays 58, 59 and 60 are energised none of the others can be energised and no relay can be de-energised whilst the transistor 125 is conducting, indicating, as will be explained later, that the current passing through the various contacts is too great for safe opening. It will be noted that the diode 66 causes the coil 54 to be energised when the contacts 56 are closed so that energising of the relay coil 59 causes both coils 53 and 54 to be energised which, as will be seen from FIG. 1 is the condition required for reverse running.

Turning now to FIG. 4, the circuit shown is required to create the brake demand signal for the terminal 95 and to generate a motor current demand signal at a terminal 133. The circuit includes a speed transducer, which is not shown in detail, but which produces a pulse train, the frequency of which is linearly related to the forward speed of the vehicle in which the system is used. The speed transducer provides a control signal to two voltage control networks 134, 135 which are broadly as described in our Co-Pending application No. 31313/73 (with particular reference to FIG. 9 thereof). The control voltage generated by the voltage control 134 is applied to one end of a brake pedal operated potentiometer 136 the other end of which is connected to the earth rail 73 via a variable resistor 137. The variable point of the potentiometer 136 is connected via a resistor 138 to the invert input terminal of an operational amplifier 139, the non-invert input terminal of which is connected via a resistor 140 to the earth rail 73. The output terminal of the operational amplifier 139 is connected to the base of a p-n-p transistor 141 which has its collector connected via a resistor 142 to a negative supply rail 143. The emitter of the transistor 141 is connected to the invert input terminal of the operational amplifier 139 via a resistor 144 and a capacitor 145 in parallel. The voltage control 135 has its output terminal connected to one end of an accelerator pedal operated potentiometer 146 the opposite end of which is connected to the emitter of the transistor 141. The operational amplifier 139 and its associated components provide an inverting amplifier configuration with substantially unity gain so that the voltage applied to said other end of the potentiometer 146 is below earth level. The voltage controls 134, 135 determine the range of voltages which can be applied to the slider of the potentiometer 146 and this range as explained in application No. 31313/73 changes with speed.

The slider of the potentiometer 146 is connected to earth via resistor 147 and also by a resistor 148 and a capacitor 149 in series for smoothing purposes. The junction of the resistor 148 and the capacitor 149 is connected to the invert input terminal of an operational amplifier 150 via a resistor 151, and also to the non-invert input terminal of the amplifier 150 via two resistors 152, 153 in series, these two resistors being of value equal to that of the resistor 151. The output terminal of the amplifier 150 is connected via a resistor 154 to one side of a capacitor 155 which has its other side connected to the rail 143 and the junction of the resistor 154 with the capacitor 155 is connected by a resistor 156 to the anode of a diode 157 which has its cathode connected to the base of an n-p-n transistor 158. The collector of the transistor 158 is connected to a positive supply rail 159 and its emitter is connected via two resistors 160 and 161 in series to the rail 73. The emitter of the transistor 158 is also connected via a resistor 162 to the rail 143 and the terminal 133 is also connected to the emitter of the transistor 158. The junction of the resistors 160 and 161 is connected via a resistor 163 connected to the invert input terminal of the amplifier 150, the resistor 163 being of the same value as the resistor 151.

The junction of the resistors 152 and 153 is connected to the collector of an n-p-n transistor 164 the emitter of which is grounded to the rail 73 and the base of which is connected via a resistor 165 to the rail 73 and by a resistor 166 to the rail 143. The base of the transistor 164 is also connected by a resistor 167 to the collector of a p-n-p transistor 168 the emitter of which is connected to the rail 159 and the base of which is connected by a resistor 169 to the rail 159. The base of the transistor 168 is also connected via a resistor 170 to the cathode of a Zener diode 171 the anode of which is connected to the anode of a diode 172 which has its cathode connected to the collector of the transistor 104 (see FIG. 3).

When the transistor 164 is conducting, which occurs whenever the transistor 119 is conducting the operational amplifier 150 will operate as an inverting amplifier with a gain of two. When the transistor 164 is switched off which occurs at all other times, the operational amplifier 150 will operate as a non-inverting amplifer with the same gain. The resistors 154 and 156 and the capacitor 155 operate to limit the rate at which the current demand signal on the emitter of the transistor 133 can rise and fall. Thus, considering the situation when the transistor 164 is switched off and there is a stop increase in the input to the amplifier 150 this step input will not be seen at the emitter of the transistor 158 because of the time constant of the resistor 154 and the capacitor 155. Whilst the output at the terminal 133 is rising slowly the output signal from the operational amplifier 150 will swing to the full positive rail voltage causing the rate at which the capacitor 155 charges to be determined purely by the voltage held at any time on the capacitor 155.

The terminal 95 is at the cathode of a diode 271 connected via a resistor 272 to the earth rail 73. The anode of the diode 271 is connected to the output terminal of an operational amplifier 173 which has its invert terminal connected by a resistor 174 to the interconnection of the resistor 148 and the capacitor 149. The non-invert terminal of the amplifier 173 is connected via a resistor 175 to the rail 73 and by a resistor 176 of comparatively large value to the rail 143. A resistor 178 provides positive feedback between the output terminal of the amplifier 173 and its non-invert input terminal so that the amplifier 173 operates as a comparator with its output terminal at the positive rail voltage whenever the voltage on the slider of the potentiometer 146 is negative and at the negative rail voltage whenever the voltage on the slider of the potentiometer 146 is positive.

Turning finally to FIG. 2 the circuit shown therein has an input terminal 180 which is connected to the output terminal of the compensation network 51 associated with the amplifier 47 shown in FIG. 1. The terminal 180 is connected by a capacitor 181 and a resistor 182 in parallel to the earth rail 73 and via a resistor 183 to the invert terminal of an operational amplifier 184. The terminal 180 is also connected via two resistors 185 and 186 in series to the non-invert terminal of the amplifer 184 the resistors 185 and 186 being of the same ohmic value as the resistor 183. An n-p-n transistor 187 has its collector connected to the junction of the resistors 185 and 186 and its emitter connected to the ground rail 73 and its base is connected to the ground rail 73 by a resistor 188 and to the negative supply rail 143 by a resistor 189. The base of the transistor 187 is also connected by a resistor 190 to the collector of a transistor 191 which has its emitter connected to the rail 159. The base of the transistor 191 is connected to the rail 159 by a resistor 192 and is also connected by a resistor 193 to the cathode of a Zener diode 194 which has its anode connected to the terminal 103 of FIG. 3. The output terminal of the amplifier 184 is connected to the cathode of a diode 195 the anode of which is connected via a resistor 196 to one end of a potentiometer 197 the other end of which is grounded via a resistor 198. The slider of the potentiometer 197 is connected to the invert input terminal of the amplifier 184 by a resistor 199 and a capacitor 200 in parallel. With the slider of the potentiometer 197 in a mid position the amplifier 184 operates in the inverting mode when the transistor 187 is conducting and in the non-inverting mode when the transistor 187 is switched off, the gain in both cases being the same. The transistor 187 conducts whenever either of the relays 59 or 60 is energised, i.e. whenever the current flow through the armature 15 is reversed either as a result of braking or as a result of being energised in the reverse direction.

The anode of the diode 195 is also connected via a resistor 201 to the invert input terminal of an operational amplifier 202 and the terminal 133 is also connected to this terminal of the amplifier 202 by a resistor 203. The invert terminal of the amplifier 202 is connected to the ground rail 73 by two reverse connected diodes 204, 205 and a capacitor 206 in parallel and its non-invert input terminal is connected to the rail 73 by a resistor 207. The output terminal of the amplifier 202 is connected to its non-invert input terminal by a pair of resistors 208, 209 in series, the resistor 208 being bridged by a capacitor 210.

The amplifier 202 operates as a voltage comparator with its output swinging between the positive and negative rail voltages according to whether the demand current signal at the terminal 133 is larger or smaller instantaneously than the signal received via the diode 195. The output terminal of the amplifier 202 is connected to a firing circuit 211 for the thyristors, such firing circuit causing the thyristor $S_2$ to be fired when the demand signal is smaller and the thyristors $S_1$ and $S_3$ to be fired when the demand signal is the larger.

This function is, however, modified by a circuit shown in FIG. 2 which determines the maximum on time for the thyristor $S_1$. This circuit includes a transistor 212 the base of which is connected to the negative rail 143 via a resistor 213 and to the output terminal of the amplifier 202 by a resistor 214. The emitter of the transistor 212 is connected to the rail 143 and its collector is connected to the ground rail 73 via a resistor 215. The collector of the transistor 212 is also connected to the rail 143 via a capacitor 216 and to the emitter of a unijunction transistor 217 which has its primary and secondary bases connected to the rails 73 and 143 respectively by resistors 218 and 219. The secondary base of the transistor 217 is also connected to the anode of a diode 220 the cathode of which is connected by a resistor 221 and a capacitor 222 in series to the rail 213. A resistor 223 is connected in parallel with the capacitor 222 and the junction of the resistor 221 and capacitor 222 is connected by a resistor 224 to the base of an n-p-n transistor 225 having its collector connected to the invert input terminal of the amplifier 202. The emitter of the transistor 225 is connected to the rail 143 via a resistor 226 and its collector is connected to the rail 73 by a resistor 227.

Immediately before the thyristors $S_1$ and $S_3$ are fired the output of the amplifier 202 is at the positive rail level so that the transistor 212 is conductive thereby discharging the capacitor 216. When the amplifier 33 changes state, however, to fire the thyristors $S_1$ and $S_3$ the transistor 212 will be turned off and the capacitor 216 will start to charge. After a predetermined delay the unijunction transistor 217 conducts, the capacitor 222 charges and a pulse is applied by way of the base/emitter diode of the transistor 225 to the inverting terminal of the amplifier 202 this will cause the output of the amplifier 202 to become positive again and the thyristor $S_2$ will be fired thereby turning off thyristor $S_1$.

When regenerative braking is selected it is required to extend this minimum offtime of the thyristor $S_1$ and this is effected by means of an additional circuit included in FIG. 2 and consisting of an n-p-n transistor 228 with its emitter connected to the rail 143 and its collector connected via a resistor 229 to the junction of the resistor 221 and the capacitor 222. The base of the transistor 228 is connected to the rail 143 by a resistor 230 and also by a registor 231 to the anode of a Zener diode 232, the cathode of which is connected to the collector of the transistor 104 (i.e. terminal 104a in FIG. 3). The cathode of the Zener diode 232 is also connected via a resistor 233 to the positive voltage rail of the circuit of FIG. 3.

FIG. 2 also shows the circuit which generates the signal applied to the terminal 127 in FIG. 3 and this circuit includes an operational amplifier 235 with its invert input terminal connected by a resistor 236 to the anode of the diode 195 and its non-invert input terminal connected by a resistor 237 to the earth rail 73. Positive feedback is provided by a resistor 238 connecting the output terminal of the amplifier 235 to the non-invert input terminal and the output terminal of the amplifier 235 is connected to the anode of a diode 239 the cathode of which is connected to the terminal 127 and also connected by a resistor 240 to the rail 73.

Finally FIG. 2 shows the circuit whereby the contact 41 shown in FIG. 1 is operated to energise the field winding when no other current is available. In this circuit terminal 104a from FIG. 3 is connected to the cathode of a diode 250 the anode of which is connected via two resistors 251 and 252 in series to the positive rail 69. A p-n-p transistor 253 has its emitter connected to the rail 69 and its base connected to the common point of the resistors 251 and 252. The collector of the transistor 253 is connected via two resistors 254 and 255 in series to the rail 73. The collector of the transistor 253 is also connected to an input terminal of the firing circuit 211 which inhibits operation of the latter for as long as the transistor 253 is conductive. The terminal 127 is connected via a pair of resistors 256, 257 in series to the rail 73 and the common point of these two resistors is connected to the base of an n-p-n transistor 258 with its emitter grounded to the rail 73. The collector of the transistor 258 is connected to the common point of the resistors 255, 254 and to the base of a further n-p-n transistor 259 with its emitter grounded. The collector of the transistor 259 is connected via three resistors 260, 261 and 262 in series to the rail 69, the resistors 261 and 262 being bridged by a capacitor 263. The common point of the recistors 261 and 262 is connected to the base of a p-n-p transistor 264 with its emitter connected to the rail 69 and its collector connected through a relay coil 265 which operates the contact 41 to the rail 73. A diode 266 has its cathode connected to the collector of the transistor 264 and its anode connected to the rail 73, and serves to conduct the reverse voltage induced in tue coil 265 when the transistor 264 is switched off.

During normal forward running conditions the output of the current demand signal generator will be positive and the thyristor chopper circuit will therefore be operating to provide an average current through the motor to match the current thus demanded. When the accelerator pedal is released and the brake pedal pressed the amplifier 173 will produce a brake demand signal at terminal 95. This is applied to the circuit of FIG. 3 and provided the speed of the vehicle is sufficient to maintain a positive input on the terminal 96 the transistor 81 will be turned off as will the transistors 77 and 79. Current through the coil 58 will be maintained by the transistor 125 until the current drawn by the motor falls below the threshold level at which the signal at 127 fails to a negative level and turns off the transistor 125. The relay coil 58 is then de-energised and after a period set by the delay circuit 74 the transistor 72 will become conductive again and the signals on terminals 95 and 96 will cause the transistor 111 to be turned off so that the transistor 107 is turned off and the transistors 119 and 104 are turned on thereby energising the relay 60 but not yet latching it. During this sequence of operations the thyristor 24 has been maintained in its non-conductive condition and when the voltage at terminal 104 falls as the relay 60 is energised the transistor 253 in FIG. 2 becomes conductive thereby resulting in energisation of the relay coil 265 to close the contact 41. Current is thereby passed through the field winding 23 to maintain the field in the motor even though the armature current has fallen substantially to zero. The armature current now increases again until the threshold current is reached so that the transistor 125 is turned on to latch the relay 60 and turn off the relay 265.

I claim:

1. A control circuit for the d.c. motor of an electrically driven vehicle, said circuit comprising a motor current demand signal generator for generating a current demand signal; a motor current transducer circuit means for generating a signal representative of actual current to the motor; a motor control circuit coupled to said transducer circuit means and to said current demand signal generator and responsive to outputs thereof for controlling motor current in said motor in accordance with error between said current demand signal and said signal representative of actual current; said demand signal generator including an operational amplifier having an inverting input terminal, a non-inverting terminal and an output terminal, a potentiometer having its slider moveable by an accelerator member operatively connected to said motor, said slider being electrically connected to said inverting input terminal of said operational amplifier, a capacitor having one terminal connected by a first resistor to said output terminal of said operational amplifier and by a second resistor to the base of a transistor as an emitter follower, the emitter of said transistor providing the current demand signal and being coupled via a feedback resistor to said inverting input terminal of the operational amplifier.

2. A control circuit as claimed in claim 1 wherein said connection between the slider of the potentiometer and the inverting input terminal of the operational amplifier is resistive, a further resistance chain connecting the slider of the potentiometer to the non-inverting input terminal of the operational amplifier, and switch means for earthing a point in said resistance chain so that the amplifier operates in the inverting mode when said point is earthed and in the non-inverting mode when said point is not earthed.

3. A control circuit as claimed in claim 2 in which said switch means is a transistor.

4. A control circuit as claimed in claim 1 in which the emitter of the emitter follower transistor is connected to the feedback resistor via a resistive potential divider.

5. A control circuit as claimed in claim 1 including an R.C. smoothing circuit interposed between the slider of the potentiometer and the operational amplifier.

* * * * *